United States Patent
Onda

(10) Patent No.: US 8,414,004 B2
(45) Date of Patent: Apr. 9, 2013

(54) SPRING SEAT AND MOUNTING STRUCTURE FOR SPRING SEAT

(75) Inventor: Kenichi Onda, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 517 days.

(21) Appl. No.: 12/727,322

(22) Filed: Mar. 19, 2010

(65) Prior Publication Data

US 2010/0243848 A1  Sep. 30, 2010

(30) Foreign Application Priority Data

Mar. 30, 2009  (JP) ................................. 2009-081566

(51) Int. Cl.
*B60G 11/16* (2006.01)

(52) U.S. Cl. ............ 280/124.151; 280/124.179; 267/33; 267/140.4; 267/179; 267/169

(58) Field of Classification Search ........... 280/124.179, 280/124.141, 124.142, 124.151; 267/286, 267/287, 166, 169, 179, 133, 170, 140.4, 267/141.1, 221–223; B60G 11/16
See application file for complete search history.

(56) References Cited

U.S. PATENT DOCUMENTS

| 5,421,565 | A  | * | 6/1995  | Harkrader et al. ............ 267/220 |
| 6,149,171 | A  | * | 11/2000 | Bono et al. ............. 280/124.179 |
| 6,254,072 | B1 | * | 7/2001  | Bono et al. ..................... 267/220 |
| 6,733,023 | B2 | * | 5/2004  | Remmert et al. ...... 280/124.179 |
| 6,857,626 | B2 | * | 2/2005  | Burlage et al. ................ 267/220 |
| 7,959,171 | B2 | * | 6/2011  | Takahashi et al. ..... 280/124.151 |

FOREIGN PATENT DOCUMENTS

| EP | 0 778 166 A2   | 6/1997  |
| JP | 2000-153704    | 6/2000  |
| JP | 2007-327595 A  | 12/2007 |

OTHER PUBLICATIONS

Office Action for Chinese Application No. 201010112491.0 dated Aug. 24, 2011.

* cited by examiner

*Primary Examiner* — Ruth Ilan

(74) *Attorney, Agent, or Firm* — Alston & Bird LLP

(57) ABSTRACT

A spring seat is mounted to a suspension arm to receive a coil spring of a suspension, a spring seat body is provided with a receiving part for receiving the coil spring and a locking protrusion, which projects from the spring seat body to the side opposite to the receiving part so as to be locked in a locking hole formed in the suspension arm, are formed integrally using an elastic member, and a core material harder than the elastic member is incorporated in the spring seat body and the locking protrusion.

8 Claims, 6 Drawing Sheets

SPRING SEAT AND MOUNTING STRUCTURE FOR SPRING SEAT

CROSS REFERENCE TO RELATED APPLICATIONS

This application claims the benefit of Japanese Patent Application No. 2009-081566, filed Mar. 30, 2009, which is incorporated herein by reference in its entirety and for all purposes.

FIELD OF THE INVENTION

The present invention relates to a spring seat mounted on a suspension arm to receive a coil spring for a suspension.

BACKGROUND

A spring seat includes a receiving part for receiving the end portion of a coil spring, and prevents the generation of noise and the abrasion of a suspension arm and the coil spring caused by the direct contact of the coil spring with the suspension arm.

In the case in which the suspension arm on which the spring seat is mounted is made of steel, the spring seat can be provided easily on the suspension arm by molding a mounting part of a spring seat for positioning and holding the spring seat by press molding or by weldedly fixing a bracket provided with the receiving part to the suspension arm.

Unfortunately, a structure in which the suspension arm is formed of an extruded material of aluminum has a problem of having difficulty in employing the above-described manufacturing means. For this reason, a bracket provided with the receiving part must be fasteningly fixed to the suspension arm with attaching bolts or the like, so that the mounting of the bracket to the suspension arm takes much time and labor, and the mounting workability is deteriorated.

As a technique for solving this problem, conventionally, as disclosed in sections [0024] to [0027] in the specification and FIG. 3 of the drawings of Patent Document 1 (Japanese Patent No. 3522130), there has been applicable a technique in which a spring seat body provided with the receiving part for receiving the coil spring and a locking protrusion, which projects from the spring seat body to the side opposite to the receiving part and is insertedly locked in a locking hole formed in the suspension arm are formed integrally using an elastic member.

According to the technique of Patent Document 1, since the locking protrusion is formed by the elastic member, the locking protrusion subjected to loads in the up and down direction and in the radial direction of the spring seat when the vehicle is running deforms greatly. Therefore, the position and posture of the spring seat becomes unstable, and additionally the durability of locking protrusion is decreased.

SUMMARY OF THE INVENTION

The present invention has been made in view of the above circumstances, and accordingly an object thereof is to provide a spring seat capable of being mounted to a suspension arm easily, regardless of the material of the suspension arm, to improve the mounting workability, that is capable of making the position and posture thereof mounted to the suspension arm stable, and that is capable of improving the durability thereof, and a mounting structure for the spring seat.

A first aspect of the present invention is characterized by a spring seat that is mounted to a suspension arm to receive a coil spring of a suspension, wherein a spring seat body provided with a receiving part for receiving the coil spring and a locking protrusion, which projects from the spring seat body to the side opposite to the receiving part so as to be locked in a locking hole formed in the suspension arm, are formed integrally using an elastic member; and a core material harder than the elastic member is incorporated in the spring seat body and the locking protrusion.

According to this configuration, since the spring seat is mounted to the suspension arm by locking the locking protrusion formed integrally using the elastic member in the locking hole formed in the suspension arm, the spring seat can be mounted to the suspension arm easily, so that the mounting workability for mounting the spring seat to the suspension arm can be improved.

Also, since the core material harder than the elastic member is incorporated in the spring seat body and the locking protrusion, the deformation of the spring seat is restrained (regulated), so that loads from the coil spring can be reliably received. Furthermore, the deformation amount of the locking protrusion at the time when the vehicle is running decreases. Therefore, the position and posture of the spring seat can be made stable, and moreover, the durability of the locking protrusion can be improved.

In the first aspect of the present invention, furthermore the locking protrusion is provided in plural numbers so as to have different diameters, and the locking hole is provided in plural numbers so as to have different diameters. Therefore, as compared with a structure in which a single locking protrusion is locked merely in a single locking hole, the mounting posture of the spring seat with respect to the suspension arm can be made more stable. Furthermore, since the plurality of locking protrusions have different diameters, and the plurality of locking holes have different diameters, the mounting posture (orientation) of the spring seat with respect to the suspension arm is restricted, so that mistaken assembly can be prevented.

In the first aspect of the present invention, furthermore the locking protrusions project from a pair of spring seat body parts positioned with the axis of the spring seat body being held therebetween; the pair of locking protrusions are positioned with the axis of the spring seat body being held therebetween; core material parts in the pair of locking protrusions are off-centered from the axes of the locking protrusions; and the off-center direction of the pair of core material parts is set so as to be a direction in which the core material parts in the pair of locking protrusions are separated from each other or so as to be a direction in which the pair of core material parts come close to each other. This configuration can achieve the effects described below.

As compared with the structure in which a single locking protrusion is locked merely in a single locking hole, the mounting posture of the spring seat with respect to the suspension arm can be made more stable.

Also, in the locking protrusion, of a pair of locking protrusion portions positioned with the core material part being held therebetween, one locking protrusion portion is allowed to have a large volume, and in turn a large elastic deformation amount, so that the locking workability for locking the locking protrusion in the locking hole can be improved.

Furthermore, the other locking protrusion portion is allowed to have a small volume, and in turn a small elastic deformation amount, so that the displacement of the locking protrusion and the spring seat body at the time when loads are applied in the radial direction and the up and down direction of the spring seat body from the coil spring can be decreased. Therefore, the deformation amount of the locking protrusion at the time when the vehicle is running decreases, so that the position and posture of the spring seat can be made stable.

In the first aspect of the present invention, furthermore the spring seat body part includes an overhanging part overhanging to the outside in the radial direction from the spring seat body and a non-overhanging part located on the inside of the overhanging part. This configuration can achieve the effect described below.

The size of the locking protrusion with respect to the spring seat body can be increased. Therefore, high loads from the coil spring can be received surely by the spring seat, and the durability of the locking protrusion can be improved more.

In the first aspect of the present invention, furthermore the locking protrusion is formed so as to have a circular cross section, and the core material part in the locking protrusion is formed so as to have an arc-shaped transverse cross section extending along the outer peripheral surface of the locking protrusion. Therefore, stresses can be prevented from concentrating in a part of the locking protrusion. Also, the rigidity of the core material part in the locking protrusion can be enhanced, stresses can be prevented from concentrating in a part of the core material part, the transmission area of loads can be increased, and the durability of the locking protrusion can be improved more.

A second aspect of the present invention is characterized by a mounting structure for a spring seat, wherein the spring seat is mounted to a suspension arm. According to this configuration, the same effects as those achieved by any one of the configurations described above can be achieved.

A third aspect of the present invention is characterized by a mounting structure for spring seat, wherein the spring seat described above is mounted to a suspension arm; the locking hole is provided in a pair in the suspension arm at an interval in the lengthwise direction of the suspension arm, and the pair of locking holes have different diameters; one locking hole having a larger diameter is disposed on the wheel side of the other locking hole; the pair of locking protrusions have different diameters; and one locking protrusion having a larger diameter is locked in the one locking hole, and the other locking protrusion is locked in the other locking hole. This configuration can achieve the effects described below.

Since the locking hole is provided in a pair in the suspension arm at an interval in the lengthwise direction of the suspension arm, the decrease in rigidity of the suspension arm can be made minimum. When the suspension arm oscillates up and down around the axis along the front and rear direction of vehicle, the wheel-side portion of the spring seat is subjected to relatively high loads from the coil spring. However, according to the above-described configuration, one locking hole having a larger diameter is provided on the wheel side of the other second locking hole, and one locking protrusion having a larger diameter is locked in one locking hole. Therefore, the locking protrusion and the core material on the wheel side can be increased in size, and thereby high loads from the coil spring can be received surely by the spring seat.

In the third aspect of the present invention, furthermore the core material part in the one locking protrusion having a larger diameter is disposed on the wheel side of the axis of the one locking protrusion. Thereby, high loads from the coil spring can be received surely by the spring seat.

According to the present invention, there can be provided a spring seat capable of being mounted to a suspension arm easily regardless of the material of the suspension arm to improve the mounting workability, capable of making the position and posture thereof mounted to the suspension arm stable, and capable of improving the durability thereof, and a mounting structure for the spring seat.

DETAILED DESCRIPTION

Embodiments of the present invention will now be described with reference to the accompanying drawings.

Figure 1:
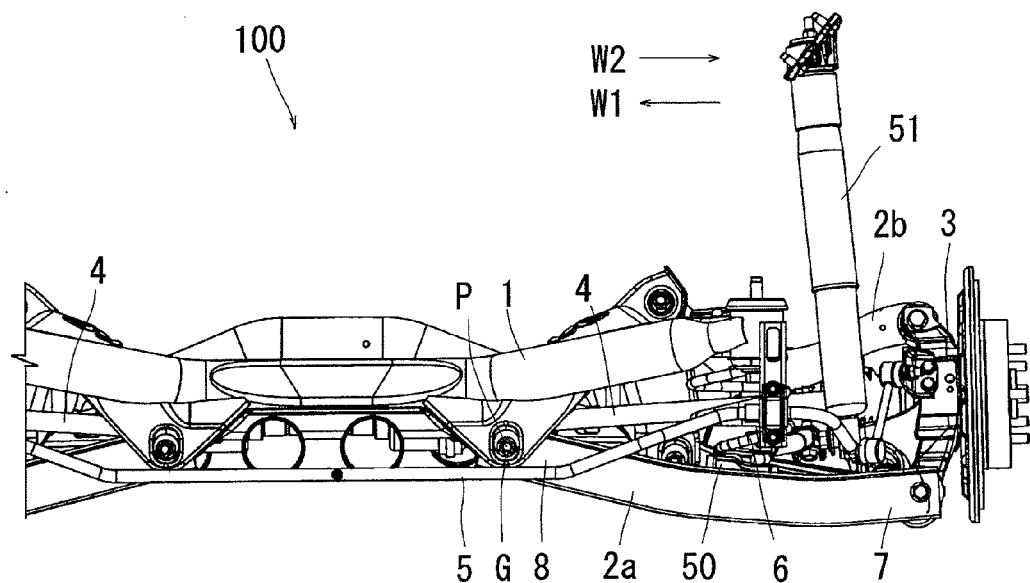
FIG. 1 is a view of a trailing arm type suspension viewed from the rear side of a vehicle.
Figure 2:
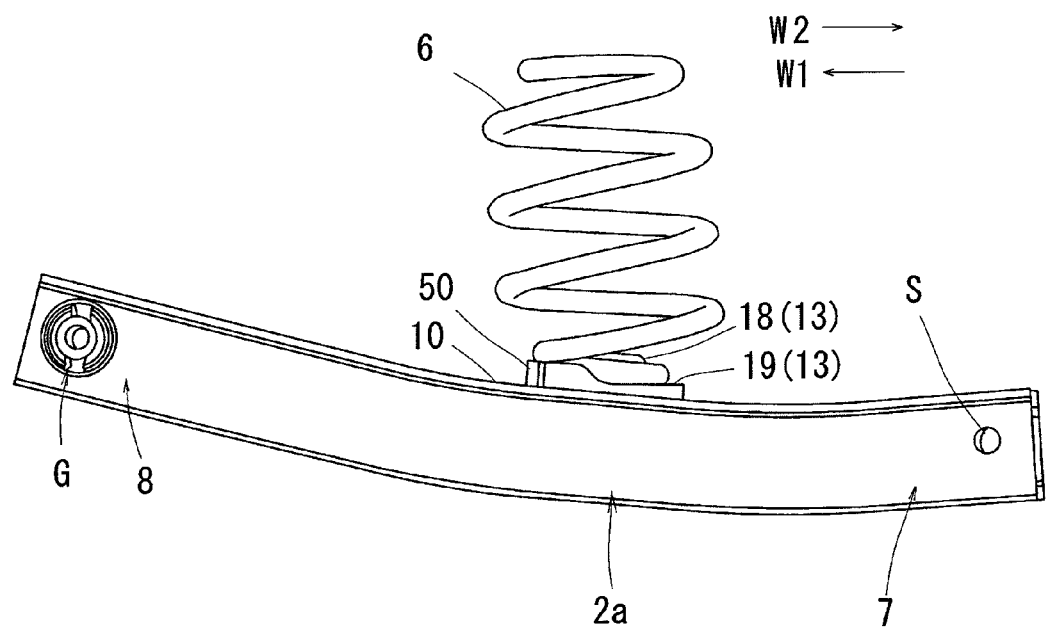
FIG. 2 is an enlarged view showing an assembling construction of a lower arm, a coil spring, and a spring seat.

FIGS. 1 and 2 show a trailing arm type suspension 100 provided on a rear vehicle body of a motor vehicle. The trailing arm type suspension 100 includes a suspension frame 1 provided between a pair of right and left side members of a vehicle body frame extending along the front and rear direction of the vehicle. The suspension frame 1 supports a knuckle 3 via a plurality of arms 2a and 2b extending along the vehicle width direction so that the knuckle 3 can oscillate up and down around an axis P extending along the front and rear direction of the vehicle.

Reference numeral 4 denotes an axle, and one end portion on the wheel side W2 (the outside in the vehicle width direction) of the axle 4 penetrates the knuckle 3. Reference numeral 5 denotes a stabilizer bar, and 51 denotes a shock absorber. Between a lower arm 2a (corresponding to a suspension arm) of the plurality of arms 2a and 2b and the lower surface of the side member, a coil spring 6 is interposed. Also, in an upper wall part 10 of a lengthwise intermediate portion of the lower arm 2a, a spring seat 50 for receiving the coil spring 6 of the suspension 100 is mounted.

Construction of the Lower Arm 2a

As shown in FIGS. 1, 2, 3(A), 3(B) and 3(C), the lower arm 2a is formed of an extruded material of aluminum, and is provided with a first connecting part 7 connected to the knuckle 3 in the end portion on the wheel side W2 thereof and a second connecting part 8 connected to the suspension frame 1 in the end portion on the inside W1 in the vehicle width direction (the center side in the right and left direction of the motor vehicle) thereof.

The second connecting part 8 is formed with a through hole penetrating in the front and rear direction of the vehicle, and a rubber bush G is pressed in the through hole. Via this rubber bush G, the second connecting part 8 is connected to the suspension frame 1. The rubber bush G is made up of an internal cylinder, an external cylinder, and a rubber-form elastic body connecting the internal cylinder to the external cylinder. Between the first connecting part 7 and the knuckle 3 as well, a rubber bush, which is made up of an internal cylinder, an external cylinder, and a rubber-form elastic body connecting the internal cylinder to the external cylinder, is interposed. The first connecting part 7 is formed with a bolt insertion hole S for allowing an attachment bolt, which is inserted through the internal cylinder, to be inserted therethrough.

Figure 3A:
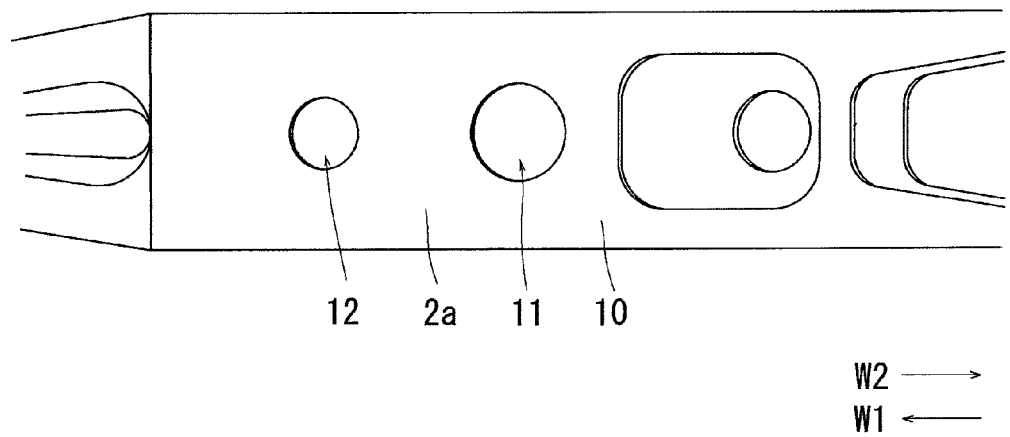
FIG. 3(A) is a plan view of a lower arm.
Figure 3B:
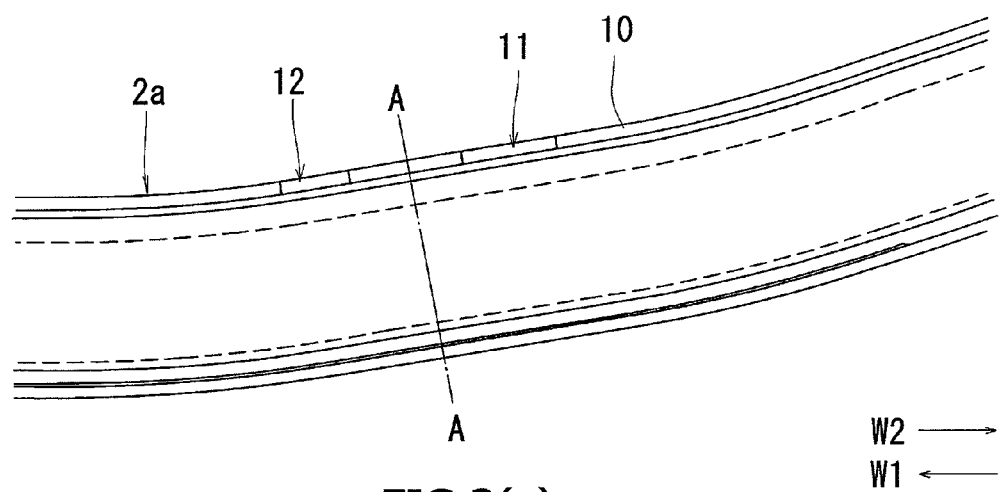
FIG. 3(B) is a rear view of the lower arm viewed from the front and rear direction of a vehicle.
Figure 3C:
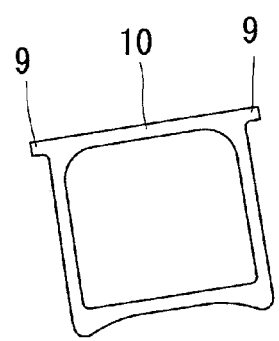
FIG. 3(C) is a sectional view taken along the line A-A of FIG. 3(B)

As shown in FIGS. 3(A) and 3(B), the lengthwise intermediate portion of the lower arm 2a is formed into a rectangular cylinder having a rectangular ring shaped longitudinal cross section, and the upper wall part 10 is formed with a pair of right and left flanges 9 projecting to the outside at the right and left. The lengthwise intermediate portion of the lower arm 2a is curved gently so as to be convex to the lower side.

As shown in FIGS. 3(A) and 3(B), a first locking hole 11 and a second locking hole 12 (a pair of locking holes, corresponding to a plurality of locking holes) are provided in a pair in the lengthwise intermediate portion of the upper wall part 10 of the lower arm 2a at an interval in the lengthwise direction of the lower arm 2a. The first locking hole 11 and the second locking hole 12 have different diameters, and the diameter of the first locking hole 11 is set larger than that of the second locking hole 12.

The one first locking hole 11 having a larger diameter is disposed on the wheel side W2 of the second locking hole 12.
Construction of the Spring Seat 50

As shown in FIGS. 4 to 7, the spring seat 50 is configured so that a substantially disc-shaped spring seat body 14 provided with a receiving part 13 for receiving the lower end portion of the coil spring 6 and a first locking protrusion 15 and a second locking protrusion 16 (a pair of locking protrusions, corresponding to a plurality of locking protrusions) both projecting from the spring seat body 14 to the side opposite to the receiving part 13 (the lower side) are formed integrally using a rubber-form elastic body (corresponding to an elastic member), and a metal plate shaped core material 17 harder than the rubber-form elastic body is incorporated in the spring seat body 14, the first locking protrusion 15, and the second locking protrusion 16. The first locking protrusion 15 and the second locking protrusion 16 are insertedly locked in the first locking hole 11 and the second locking hole 12, respectively (refer to FIGS. 11(A), 11(B) and 11(C)).
Construction of the Spring Seat Body 14 of the Spring Seat 50

A truncated cone shaped swelling part 18 swelling upward is formed in the central portion in the radial direction of the spring seat body 14, and a coil spring receiving concave part 19 having an arc-shaped longitudinal cross section is formed around the root of the swelling part 18, whereby the receiving part 13 is configured. The configuration is made such that the swelling part 18 extends, from the lower side, into a space surrounded by a wire in the lower end portion of the coil spring 6 (refer to FIG. 2), and the coil spring receiving concave part 19 receives the lower end portion of the coil spring 6 from the lower side.

Figure 4:
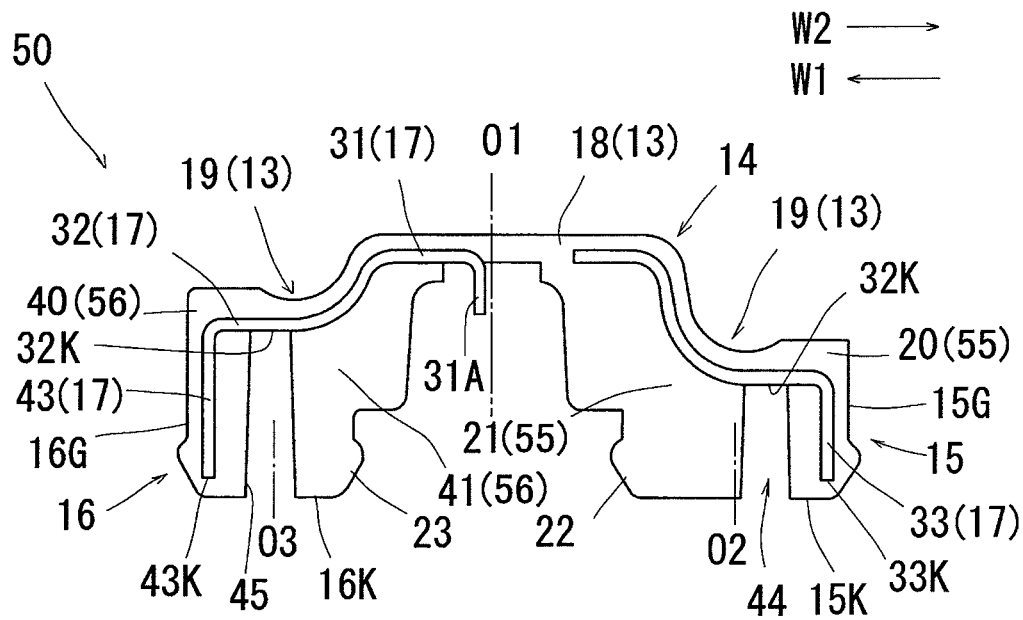
FIG. 4 is a sectional view taken along the line A-A of FIG. 5.
Figure 5:
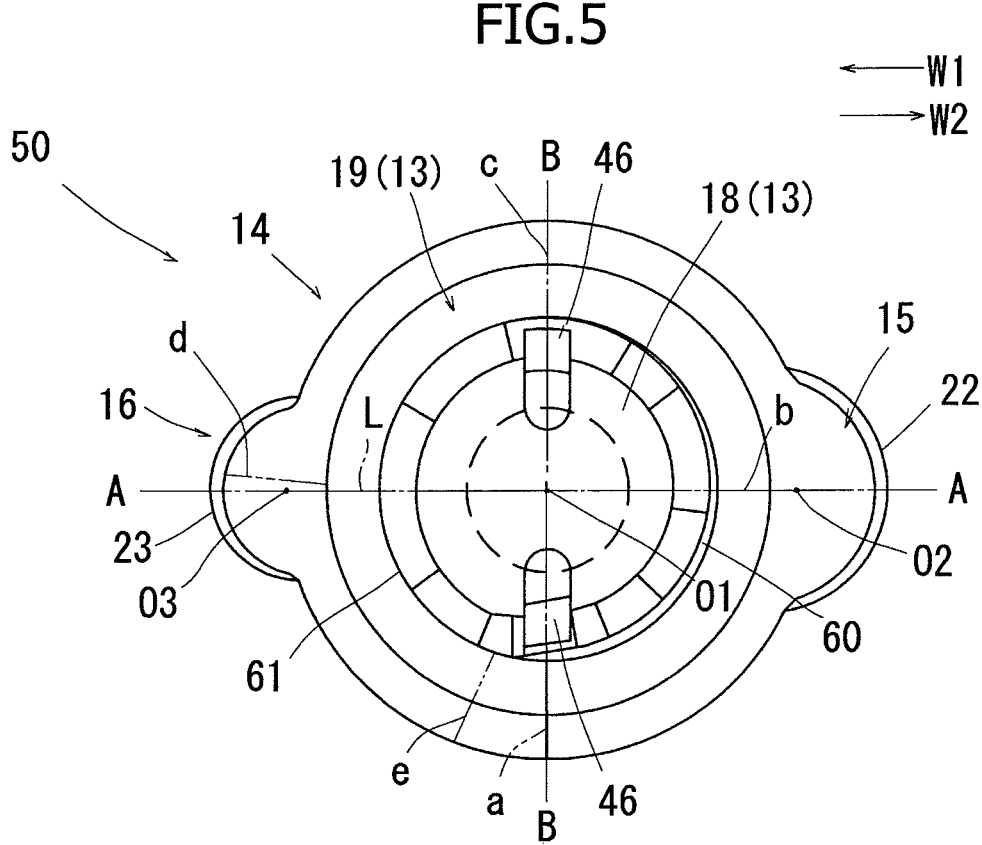
FIG. 5 is a plan view of a spring seat.
Figure 6:
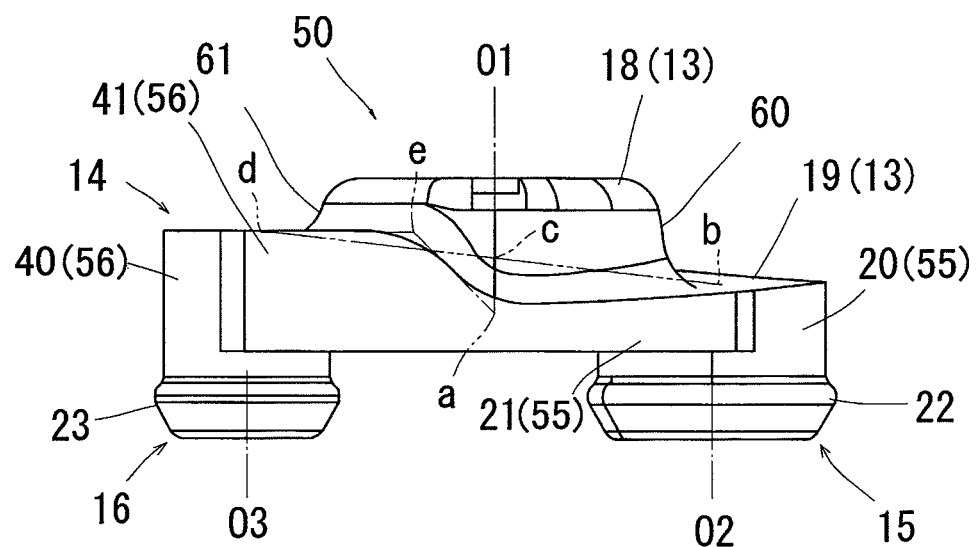
FIG. 6 is a side view of a spring seat.

As shown in FIGS. 4 to 6, the coil spring receiving concave part 19 is configured so that a section of ⅘ arc (an arc having a central angle of 288 degrees) between symbol a and symbol d and between symbol e and symbol a counterclockwise of the spring seat body 14 around the root of the swelling part 18 is formed into a spiral shape, and the remaining section of ⅕ arc (an arc having a central angle of 72 degrees) between symbol d to symbol e is formed into a non-spiral shape. A portion between symbol a and symbol d on the more forward side in the counterclockwise direction in FIG. 5 is positioned at a higher place, and a portion between symbol e and symbol a on the more forward side in the counterclockwise direction is positioned at a lower place (refer to FIG. 6).

A section 60 of ⅘ arc of the outer peripheral surface of the swelling part 18 corresponding to the section of ⅘ arc of the coil spring receiving concave part 19 is formed into a spiral shape, and a section 61 of ⅕ arc of the coil spring receiving concave part 19 is formed into a non-spiral shape.

As shown in FIGS. 4, 5 and 6, a first overhanging part 20 and a second overhanging part 40 (corresponding to a pair of overhanging parts) are formed so as to overhang to the outside in the radial direction from the spring seat body 14. The first overhanging part 20 and the second overhanging part 40 each are formed so as to have a semicircular transverse cross section, and are positioned with an axis 01 of the spring seat body 14 being held therebetween.

The first locking protrusion 15 having a circular cross section is projected from the first overhanging part 20 and a first non-overhanging part 21 of the spring seat body 14 located on the inside of the first overhanging part 20, and the second locking protrusion 16 having a circular cross section is projected from the second overhanging part 40 and a second non-overhanging part 41 of the spring seat body 14 located on the inside of the second overhanging part 40.

The first overhanging part 20 and the first non-overhanging part 21 constitute a first spring seat body part 55, and the second overhanging part 40 and the second non-overhanging part 41 constitute a second spring seat body part 56. That is to say, the first locking protrusion 15 and the second locking protrusion 16 are projected from the first spring seat body part 55 and the second spring seat body part 56, which are positioned with the axis 01 of the spring seat body 14 being held therebetween, respectively, and therefore the first locking protrusion 15 and the second locking protrusion 16 are positioned with the axis 01 of the spring seat body 14 being held therebetween.

Also, the first locking protrusion 15 and the second locking protrusion 16 have different diameters, and the diameter of the first locking protrusion 15 is set larger than that of the second locking protrusion 16.

Figure 7:
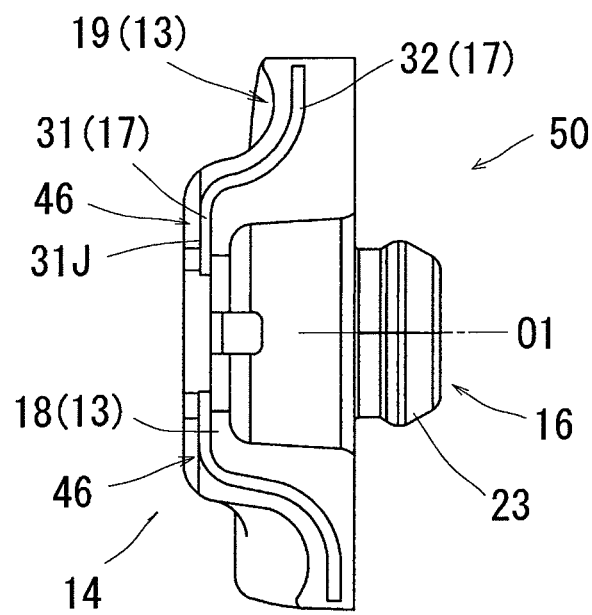
FIG. 7 is a sectional view taken along the line B-B of FIG. 5.
Figure 8:
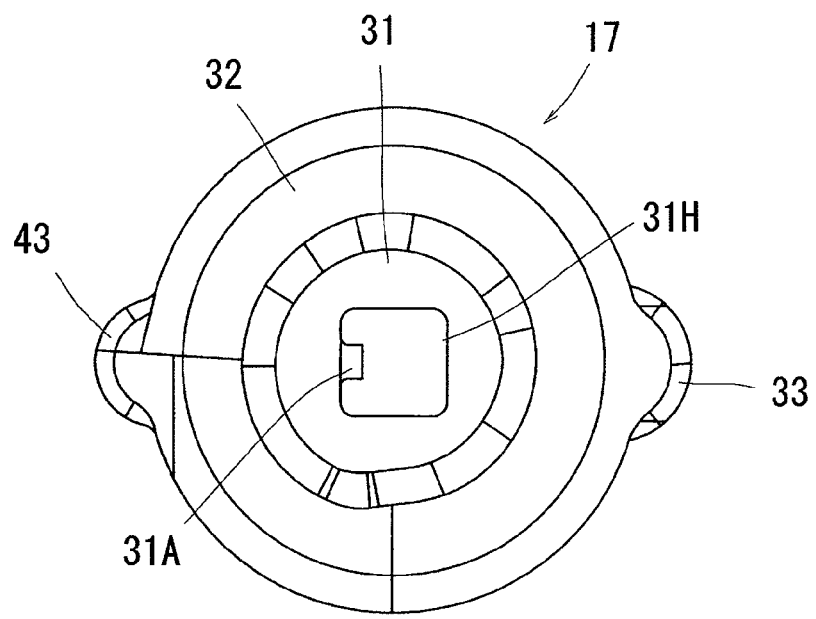
FIG. 8 is a plan view of a core material.
Figure 9:
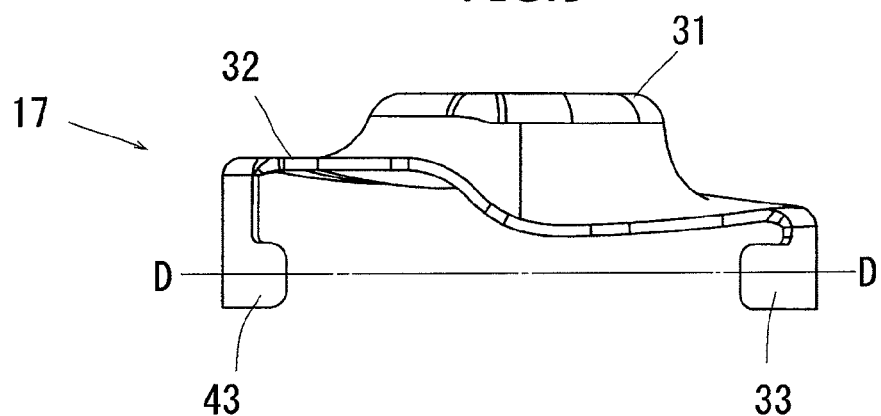
FIG. 9 is a side view of a core material.
Figure 10:
FIG. 10 is a sectional view taken along the line D-D of FIG. 9.

As shown in FIGS. 4, 6 and 7, the lower half portion of the first locking protrusion 15 is formed so that the diameter thereof is larger than the diameters of the upper half portion of the first locking protrusion 15 and the first locking hole 11, and is formed into a first coming-off preventive part 22 that prevents the first locking protrusion 15 from coming off the first locking hole 11. The first coming-off preventive part 22 is formed into a downward diameter-reducing shape such that the lower end portion thereof has a diameter smaller than that of the first locking hole 11 and the upper end portion thereof has a diameter larger than that of the first locking hole 11.

The lower half portion of the second locking protrusion 16 is formed so that the diameter thereof is larger than the diameters of the upper half portion of the second locking protrusion 16 and the second locking hole 12, and is formed into a second coming-off preventive part 23 that prevents the second locking protrusion 16 from coming off the second locking hole 12.

The second coming-off preventive part 23 is formed into a downward diameter-reducing shape such that the lower end portion thereof has a diameter smaller than that of the second locking hole 12 and the upper end portion thereof has a diameter larger than that of the second locking hole 12.

By the above-described configuration, when the first coming-off preventive part 22 is inserted into the first locking hole 11, the outer peripheral surface of the first coming-off preventive part 22 is pressed against the inner peripheral surface of the first locking hole 11, so that the first coming-off preventive part 22 is elastically deformed, extending into the first locking hole 11 while the diameter thereof is reduced. Then, the first coming-off preventive part 22 passes through the first locking hole 11, and the rear end portion of the first coming-off preventive part 22 restores elastically so as to have a diameter larger than that of the first locking hole 11. As a result, the first coming-off preventive part 22 becomes less liable to come off the first locking hole 11. Also, since the lower end portion of the first coming-off preventive part 22 has a diameter smaller than that of the first locking hole 11, and the first coming-off preventive part 22 is formed into a downward diameter-reducing shape, the outer peripheral surface of the first coming-off preventive part 22 is insertedly guided, so that the first coming-off preventive part 22 becomes easy to extend into the first locking hole 11. When the second coming-off preventive part 23 is inserted into the second locking hole 12 as well, the same behavior as described above is achieved.

Construction of the Core Material 17 of the Spring Seat 50

As shown in FIGS. 4, 8, 9 and 10, the core material 17 is a press molded product consisting of a first core material part 31, a second core material part 32, a third core material part 33 (corresponding to a core material part), and a fourth core material part 43 (corresponding to a core material part). The first core material part 31 having a turned-over dish shape is disposed in the swelling part 18 of the spring seat body 14. The second core material part 32 overhangs from the first core material part 31 to the outside in the radial direction and is located under the coil spring receiving concave part 19. The third core material part 33 having an arc-shaped transverse cross section extends downward from a part of the outer peripheral portion of the second core material part 32, getting into the first locking protrusion 15, and is provided along an outer peripheral surface 15G of the first locking protrusion 15. The fourth core material part 43 having an arc-shaped transverse cross section extends downward from a part of the outer peripheral portion of the second core material part 32, getting into the second locking protrusion 16, and is provided along an outer peripheral surface 16G of the second locking protrusion 16.

In the central portion of the first core material part 31, a square hole 31H is formed, and a rectangular positioning piece 31A extending downward from the inner peripheral portion of the square hole 31H is bendedly formed. In a vulcanization molding process for a rubber-form elastic body, the positioning piece 31A is inserted into a positioning hole in a molding tool to position the core material 17 with respect to the molding tool. As shown in FIG. 4, the upper wall of the first core material part 31 is close to the upper surface of the swelling part 18, and the peripheral wall thereof is close to the peripheral surface of the swelling part 18.

The second core material part 32 is configured so that a second core material part portion corresponding to the section of 4/5 arc (an arc having a central angle of 288 degrees) of the coil spring receiving concave part 19 is formed into a spiral shape, and a second core material part portion corresponding to the section of 1/5 arc (an arc having a central angle of 72 degrees) of the coil spring receiving concave part 19 is formed into a non-spiral shape.

As shown in FIG. 4, the third core material part 33 is off-centered from an axis 02 of the first locking protrusion 15, and the fourth core material part 43 is off-centered from an axis 03 of the second locking protrusion 16.

That is to say, the off-center direction of the third core material part 33 and the fourth core material part 43 is set so as to be a direction in which the third core material part 33 and the fourth core material part 43 (corresponding to a pair of core material parts positioned with the axis 01 of the spring seat body 14 being held therebetween) are separated from each other (may be a direction in which they come close to each other) along an imaginary line L (refer to FIG. 5) connecting the axis 02 of the first locking protrusion 15 to the axis 03 of the second locking protrusion 16.

The third core material part 33 (corresponding to a core material part in one locking protrusion having a larger diameter) is positioned on the wheel side W2 of the axis 02 of the first locking protrusion 15 (the axis of one locking protrusion), and is positioned close to the outer peripheral surface 15G of the first locking protrusion 15. The fourth core material part 43 is positioned on the wheel side W1 of the axis 03 of the second locking protrusion 16 (the axis of the other locking protrusion), and is positioned close to the outer peripheral surface 16G of the second locking protrusion 16. Also, a lower end 33k of the third core material part 33 is close to a lower surface 15K of the first locking protrusion 15, and a lower end 43k of the fourth core material part 43 is close to a lower surface 16K of the second locking protrusion 16.

Thereby, in the locking protrusion (the first locking protrusion 15, the second locking protrusion 16), of a pair of locking protrusion portions positioned with the core material part (the third core material part 33, the fourth core material part 43) being held therebetween, one locking protrusion portion is allowed to have a large volume, and in turn a large elastic deformation amount, so that the locking workability for locking the locking protrusion (the first locking protrusion 15, the second locking protrusion 16) in the locking hole (the first locking hole 11, the second locking hole 12) can be improved.

Furthermore, the other locking protrusion portion is allowed to have a small volume, and in turn a small elastic deformation amount, so that the displacement of the locking protrusion (the first locking protrusion 15, the second locking protrusion 16) and the spring seat body 14 at the time when loads are applied in the radial direction and the up and down direction of the spring seat body 14 from the coil spring 6 can be decreased. Therefore, the deformation amount of the locking protrusion (the first locking protrusion 15, the second locking protrusion 16) at the time when the vehicle is running decreases, so that the position and posture of the spring seat 50 can be made stable.

That is to say, as described above, the third core material part 33 is positioned close to the outer peripheral surface 15G of the first locking protrusion 15, and the fourth core material part 43 is positioned close to the outer peripheral surface 16G of the second locking protrusion 16. Also, the wall thickness of the rubber-form elastic body between the third core material part 33 and the outer peripheral surface 15G is decreased, and the wall thickness of the rubber-form elastic body between the fourth core material part 43 and the outer peripheral surface 16G is decreased. Thereby, the movement in the radial direction and the up and down direction of the spring seat 50 at the time when loads are applied from the coil spring 6 is restrained, and therefore the position of the coil spring 6 is made stable.

Thereby, a force from the coil spring 6 (a force from the lower arm 2a) is surely transmitted to the lower arm 2a (the coil spring 6) to make the movement of the suspension reliable, thereby improving the driving stability.

As shown in FIG. 4, a first longitudinal hole 44 that is open to the lower surface 15K of the first locking protrusion 15 and reaches a lower surface 32K of the second core material part 32 and a second longitudinal hole 45 that is open to the lower surface 16K of the second locking protrusion 16 and reaches the lower surface 32K of the second core material part 32 are formed in the first locking protrusion 15 and the second locking protrusion 16, respectively, and a part of the lower surface 32K of the second core material part 32 is exposed. As shown in FIGS. 5 and 7, in the upper end portion of the swelling part 18 of the spring seat body 14, a pair of seats 46 that are slender in the radial direction and are positioned in point symmetry with respect to the axis 01 of the spring seat body 14 are formed, and an upper surface 31J of the first core material part 31 is exposed.

By the above-described configuration, when the rubber-form elastic body is vulcanized molded, a pair of positioning convex portions on the lower side of the molding tool are brought into contact with the lower surface 32K of the second core material part 32, a pair of positioning convex portions on the upper side of the molding tool are brought into contact with the upper surface 31J of the first core material part 31, and furthermore, as described above, the positioning piece 31A is inserted into a positioning hole in the molding tool, whereby the core material 17 is positioned.

Since the first longitudinal hole 44 and the second longitudinal hole 45 are formed in the first locking protrusion 15 and the second locking protrusion 16, respectively, when the first locking protrusion 15 and the second locking protrusion 16 are inserted into the first locking hole 11 and the second locking hole 12, respectively, the first locking protrusion 15 and the second locking protrusion 16 are liable to be elastically deformed, which also offers an advantage of improved inserting workability.

According to the present invention, since the locking protrusions (the first locking protrusion 15 and the second locking protrusion 16) are insertedly locked in the locking holes (the first locking hole 11 and the second locking hole 12) in the lower arm 2a, respectively, to mount the spring seat 50 to the lower arm 2a, as compared with a structure in which a single locking protrusion is insertedly locked merely in a single locking hole, the mounting posture of the spring seat 50 with respect to the lower arm 2a can be made more stable. Also, the spring seat 50 can be mounted to the lower arm 2a easily, so that the mounting workability of the spring seat 50 can be improved.

Since the metal plate shaped core material 17 harder than the rubber-form elastic body is incorporated in the spring seat body 14, the first locking protrusion 15, and the second locking protrusion 16, the deformation of the spring seat 50 is restrained (regulated), so that loads from the coil spring 6 can be reliably received. Furthermore, the deformation amount of the first locking protrusion 15 and the second locking protrusion 16 at the time when the vehicle is running decreases. Therefore, the position of the spring seat 50 can be made stable, and moreover, the durability of the first locking protrusion 15 and the second locking protrusion 16 can be improved.

Also, since one first locking protrusion 15 having a larger diameter is insertedly locked in one first locking hole 11 having a larger diameter, and the other second locking protrusion 16 is insertedly locked in the other second locking hole 12, the mounting posture (orientation) of the spring seat 50 with respect to the lower arm 2a is restricted, so that mistaken assembly can be prevented.

Furthermore, since the first locking hole 11 and the second locking hole 12 are provided at an interval in the lengthwise direction of the lower arm 2a, the decrease in rigidity of the lower arm 2a can be made at a minimum. When the lower arm 2a oscillates up and down around the axis P along the front and rear direction of the vehicle, the wheel-side portion of the spring seat 50 is subjected to relatively high loads from the coil spring 6. However, according to the above-described configuration, one first locking hole 11 having a larger diameter is provided on the wheel side W2 of the other second locking hole 12, one first locking protrusion 15 having a larger diameter is insertedly locked in one first locking hole 11 having a larger diameter, and furthermore the third core material part 33 in the first locking protrusion 15 having a larger diameter is disposed on the wheel side W2 of the axis 02 of the first locking protrusion 15. Therefore, high loads from the coil spring 6 can be received reliably by the spring seat 50.

Figure 11:
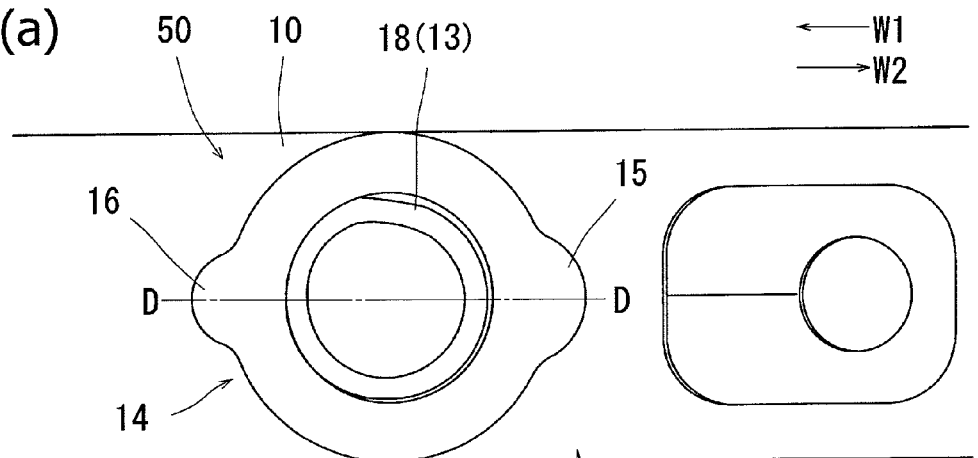
FIG. 11(A) is a plan view of a mounting structure of a spring seat mounted to a lower arm.
FIG. 11(B) is a rear view of the mounting structure of a spring seat mounted to a lower arm, viewed from the front and rear direction of a vehicle.
FIG. 11(C) is a sectional view taken along the line D-D of FIG. 11(A) (a spring seat body is shown in outline only).
Figure 11:
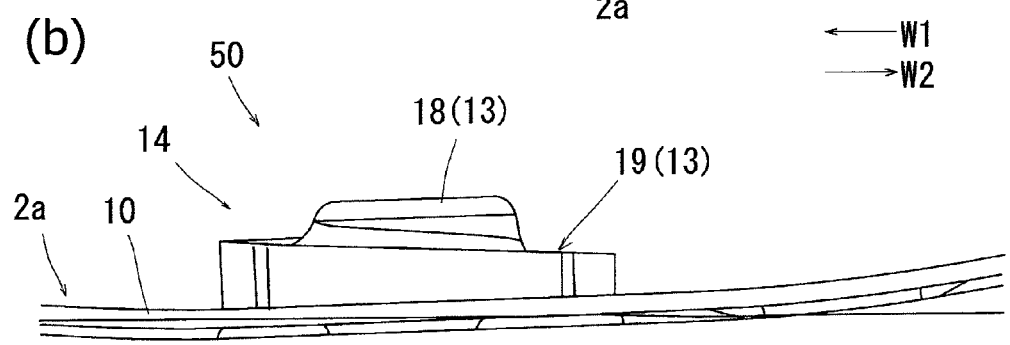
Figure 11:
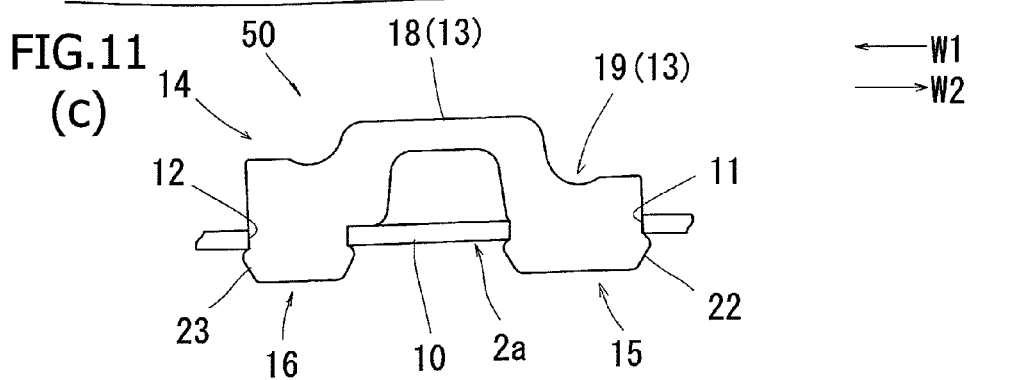

As shown in FIGS. 3 and 11(A), the diameter of the spring seat body 14 in the direction at right angles to the direction in which the first locking protrusion 15 and the second locking protrusion 16 are arranged (the direction along the imaginary line L, the lengthwise direction of the lower arm 2a) is set approximately equal to the width of the upper wall part 10 of the lower arm 2a expanded by the flanges 9, and in a state in which the spring seat 50 is mounted to the lower arm 2a, the outer peripheral edge of the spring seat body 14 is made in agreement with the side edge in the width direction of the upper wall part 10 of the lower arm 2a.

Other Embodiments

The locking protrusions 15, 16 may be provided multiply.

(2) In the above-described embodiment, explanation has been given of the spring seat 50 interposed between the lower end portion of the coil spring 6 and the upper wall part 10 of the lower frame. However, the present invention can also be applied to the spring seat 50 interposed between the upper end portion of the coil spring 6 and the suspension frame 1 on the upper side of this upper end portion.

(3) The locking protrusion may be formed so as to have a square cross section. According to this configuration, mistaken assembly can be prevented easily.

What is claimed is:

1. A spring seat which is mounted to a suspension arm to receive a coil spring of a suspension, wherein
a spring seat body provided with a receiving part for receiving the coil spring and at least two locking protrusions, which project from the spring seat body to the side opposite to the receiving part so as to be locked in a locking hole formed in the suspension arm, said spring seat body and said at least two locking protrusion are formed integrally using an elastic member; said at least two locking protrusions are provided so as to have different diameters, and at least two locking holes are provided so as to have different diameters; and
a core material harder than the elastic member is incorporated in the spring seat body and the locking protrusion.

2. The spring seat according to claim 1, wherein the locking protrusions project from a pair of spring seat body parts positioned with the axis of the spring seat body being held therebetween; the pair of locking protrusions are positioned with the axis of the spring seat body being held therebetween; core material parts in the pair of locking protrusions are radially located either more outwardly of locking protrusion axes with respect to the axis of the spring seat body or inwardly of the locking rotrusion axes with respect to the axis of the spring seat body.

3. The spring seat according to claim 2, wherein each spring seat body part includes an overhanging part overhanging to the outside in the radial direction from the spring seat body and a non-overhanging part located on the inside of the overhanging part.

4. The spring seat according to claim 3, wherein each locking protrusion is formed so as to have a circular cross section; and the core material part in the locking protrusion is formed so as to have an arc-shaped transverse cross section extending along the outer peripheral surface of the locking protrusion.

5. A mounting structure for a spring seat described in claim 2 or 3, wherein
the at least two locking holes are provided in a pair in the suspension arm at an interval in the lengthwise direction of a suspension arm, and the pair of locking holes have different diameters;
one locking hole having a larger diameter is disposed on the wheel side of the other locking hole;
the at least two locking protrusions is provided in a pair, and the pair of locking protrusions have different diameters; and
one locking protrusion having a larger diameter is locked in the one locking hole, and the other locking protrusion is locked in the other locking hole.

6. The mounting structure for a spring seat according to claim 5, wherein the core material part in the one locking protrusion having a larger diameter is disposed on the wheel side of the axis of the one locking protrusion.

7. A mounting structure for a spring seat described in claim 2 or 3, wherein
the locking hole is provided in a pair in the suspension arm at an interval in the lengthwise direction of a suspension arm, and the pair of locking holes have different diameters;
one locking hole having a larger diameter is disposed on the wheel side of the other locking hole;
the pair of locking protrusions have different diameters; and
one locking protrusion having a larger diameter is locked in the one locking hole, and the other locking protrusion is locked in the other locking hole.

8. The mounting structure for a spring seat according to claim 7, wherein the core material part in the one locking protrusion having a larger diameter is disposed on the wheel side of the axis of the one locking protrusion.

* * * * *

UNITED STATES PATENT AND TRADEMARK OFFICE
CERTIFICATE OF CORRECTION

| | | |
|---|---|---|
| PATENT NO. | : 8,414,004 B2 | Page 1 of 1 |
| APPLICATION NO. | : 12/727322 | |
| DATED | : April 9, 2013 | |
| INVENTOR(S) | : Onda | |

It is certified that error appears in the above-identified patent and that said Letters Patent is hereby corrected as shown below:

In the Claims:

Column 10,
Lines 57 and 58, "inwardlyof" should read --inwardly of--;
Line 58, "rotrusion" should read --protrusion--.

Signed and Sealed this
Thirteenth Day of August, 2013

Teresa Stanek Rea
*Acting Director of the United States Patent and Trademark Office*